June 8, 1954

T. S. SEE ET AL 2,680,283

MILLING CUTTER

Filed Nov. 10, 1950

INVENTOR.
Theodore S. See
BY Horace A. Frommelt
Mason, Kolehmainen,
Rathburn & Wyss
Attys June 8, 1954

T. S. SEE ET AL 2,680,283

MILLING CUTTER

Filed Nov. 10, 1950

INVENTOR.
Theodore S. See
BY Horace A. Frommelt
Mason, Kolehmainen,
Rathburn & Wyss
Att'ys

UNITED STATES PATENT OFFICE 2,680,283

MILLING CUTTER

Theodore S. See, Hammond, Ind., and Horace A. Frommelt, Milwaukee, Wis., assignors to La Salle Steel Company, Chicago, Ill., a corporation of Delaware Application November 10, 1950, Serial No. 195,004

5 Claims. (Cl. 29—105)

This invention relates to milling cutters, more particularly to new and improved cutters that are capable of performing high speed cutting operations without undue wear or breakage over commercially practical operating periods, and the invention has for an object the provision of durable and efficient cutters of this character. This application is a continuation-in-part of a copending application Serial No. 23,748 filed April 28, 1949, now abandoned in the names of the present inventors and Frederick W. Lindblad entitled "Milling Cutter."

While cutters embodying the present invention are not limited thereto, they are particularly designed for and are highly useful in carrying out high speed machining operations of the type described and broadly claimed in the copending application, Serial No. 171,397, filed June 30, 1950, now Patent No. 2,581,449 granted June 8, 1952, in the name of Theodore S. See and entitled "High Speed Machining of Ferrous Materials." As explained in the said See application, it has heretofore been considered uneconomical and impractical, if not impossible, in the metal removal art and particularly in the machining or milling of ferrous work pieces to operate the cutters relative to the work at speeds as high as would be desirable because of the destruction or undue wear of the cutters after relatively short periods of operation at such high speeds. Industry is primarily interested in the rate at which a work piece can be machined without unduly shortening the useful life of the cutter, or, in other words, in the maximum number of inches per minute that the work piece and the cutter can be moved relative to each other while metal is being removed from the work piece while maintaining maximum cutter life. This rate of metal removal, which may be referred to as the inches per minute (I. P. M.) or the R factor, has been used as a basis for comparing metal removal techniques and represents the product of the chip load or tooth load, the number of teeth on the cutter, and the speed of rotation (R. P. M.) of the cutter. This R factor does not, however, accurately reflect the relative merits of the cutting techniques, since it fails to take into account the cutter life, i. e., the length of time that the cutter may be operated without regrinding or replacement. For purposes of accurate comparison, therefore, reference should be had to what may be termed an RL factor, which consists of the product of the metal removal rate or R factor and the duration of the tool life between grinds.

It will be appreciated that the RL factor is thus an accurate measure not of the rate at which metal is removed or of the rate at which the work piece may be moved through the machine for some short or abnormal period during which abnormal wear or even destruction of the tool or cutter may occur, but of the rate at which machining operations may be carried out on a long time production basis while maintaining adequate tool life.

While it is readily apparent that the RL factor may theoretically be increased merely by increasing one of the component factors from which it is detehmined, i. e., the chip load, the R. P. M., or the number of teeth, it has not heretofore been found possible to do so without shortening the cutter life or the time between grinds to such an extent as to result in a decreased rather than an increased RL factor. Furthermore, it has previously been thought that all three of the factors which constitute the I. P. M. or R factor were subject to definite limitations precluding any increase beyond the conventionally accepted maximums. The chip load, for example, has had limiting minimum and maximum values determined by the cutting material, since too small a tooth load or chip load results in abrasive action causing excessive wear and heating of the cutting element while too large a chip load results in excessive compressive forces destructive of the cutting tooth.

Similarly, the R. P. M. of the cutter or tool has heretofore been considered as limited by the permissible surface foot rate, i. e., the number of feet per minute traveled by the teeth or cutting elements (S. F. M.), which is determined by the ability of the cutting element to contact the particular work piece and remove metal therefrom while remaining in satisfactory cutting condition for reasonable periods of operation. This ability of the cutting element has previously been thought to depend largely upon the hardness of the work piece, the design of the cutter and the cutting elements in so far as the rake angle and the radial angle are involved, and the material from which the cutting element is formed.

The number of teeth employed, although not so severely limited, has in the past not been increased beyond the conventionally accepted standards due to the expense of initially producing and repairing monolithic cutters in which the entire cutter body and the cutting teeth are formed of relatively expensive cutting material and due to the mechanical difficulties of securing more than the standard number of individual cutting teeth or elements on the surface of a cutter body formed of softer and less expensive material, by means of wedges, screws or similar mechanical attaching means. The expedient of brazing the cutting elements or teeth on the cutter body, while permitting the provision of a greater number of teeth per circumference inch has not been employed to any great extent for the reason that, as with the monolithic cutter, a cutter so constructed is expensive to maintain and, where carbide cutting teeth or elements are concerned, the brazing of the carbide to a steel body or matrix destroys much of the effectiveness of the carbide from a cutting standpoint.

It is well recognized that one of the major factors in shortening the life of a cutting tool is the vibration factor, which exists in all previously known types of cutters. As explained at page 317 of section 17 of the Tool Engineers Handbook, 1949 edition, the vibrations which occur in the teeth or cutting elements are of two kinds: (a) forced vibrations produced by successive contacts of the cutting teeth with the work and by irregularities in the force applied to the cutter by the driving means; and (b) self induced vibrations due to the natural frequency of the cutting element or tooth and the mechanism employed for mounting the element or tooth on the body of the cutter. The self induced vibrations are the most objectionable and, together with the forced vibrations, cause excessive wear and excessive heating of the cutting elements if the cutter is operated at speeds in excess of the above discussed maximums.

In the traditional design of milling cutters, the fundamental reason for the existence of objectionable self induced vibration is inherent in the design itself which requires hardened steel shanks, bodies and supports, and this type of vibration is magnified by the high resiliency of the cutting elements or teeth themselves. In accordance with the methods described and claimed in the aforesaid See application, a maximum number of cutting teeth are employed so arranged as to maintain more than one tooth in contact with the work at all times and so supported as to decrease the tooth vibration.

It is known in the art that the sintered carbide materials such as tungsten carbide, titanium carbide and other so-called "hard metals," usually alloys of carbides, borides, nitrides or silicides, offer excellent cutting edges for use in the milling of metal, but such materials are expensive and are subject to breakage when submitted to undue strain, and when mounted on the cutter body in conventional fashion are inherently subject to excessive vibration. Accordingly, it is a further object of the present invention to provide a new and improved cutter in which only the teeth are formed of these expensive carbide materials and the body of the cutter, composed of less expensive materials, is so constructed as to permit the use of a maximum number of teeth mounted so as to substantially decrease or eliminate tooth vibration while permitting ready replacement of individual teeth which may become broken in use.

It is still another object of the present invention to provide an improved cutter in which the teeth or blades are firmly and securely supported in a relatively soft or dead material and spaced to provide a tooth pitch of less than one-half inch.

Still another object of the present invention is to provide an improved cutter in which a plurality of carbide teeth or blades are firmly and securely held in a body of dead plastic material and spaced to provide a minimum tooth pitch, the plastic material having a low melting point compared to the material of the cutting teeth themselves and the material of the body of the cutter, thereby to permit ready replacement of broken, chipped or otherwise damaged teeth or blades.

In carrying out the invention in one form, a milling cutter is provided which comprises a hub portion on which is supported a body of relatively soft dead material, and a plurality of cutting teeth are partially imbedded in the body of dead material and spaced to provide a tooth pitch not greater than one-half inch. More specifically the hub portion of the cutter includes a rim portion provided with a plurality of recesses in the outer cylindrical face thereof for receiving the cutting teeth and the hub portion is provided with passageways adjacent the rim portion in which the dead material, which is preferably a plastic material having a low melting point, is disposed for partially imbedding the cutting teeth and maintaining the teeth in assembled relation within the recesses.

For a more complete understanding of the invention, reference should now be had to the drawings in which.

Figure 1:
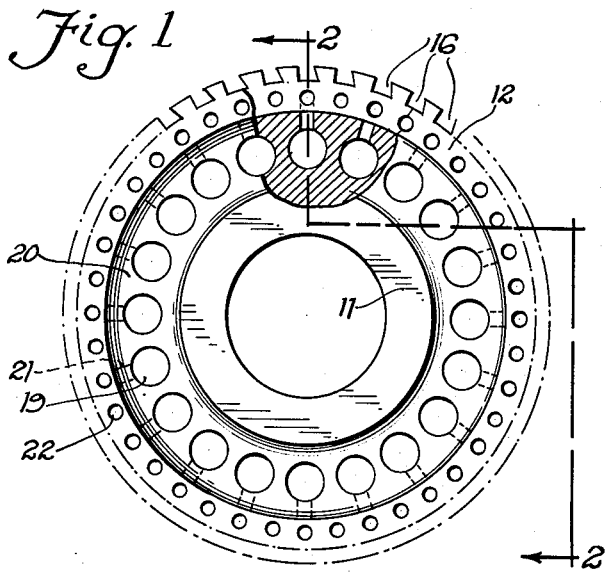
Fig. 1 is an end elevational view of the hub portion or body employed in forming a cutter embodying the present invention, a portion of the body being broken away more clearly to illustrate the internal construction.
Figure 2:
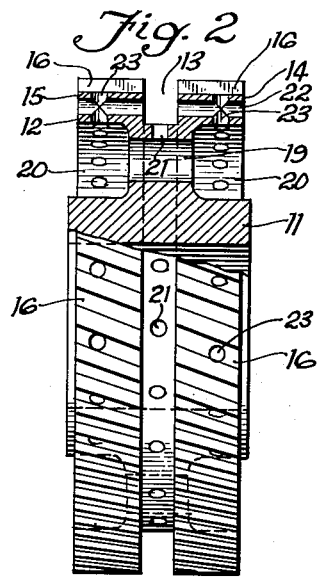
Fig. 2 is a side elevational view of the hub portion shown in Fig. 1 partially in section along the line 2—2 of Fig. 1.
Figure 3:
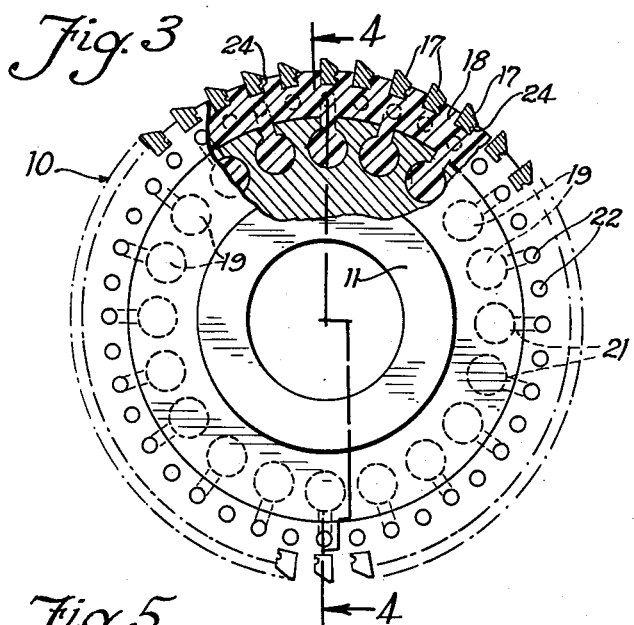
Fig. 3 is an end elevational view of the completed cutter after the cutting teeth and the plastic material have been assembled with the body portion of Fig. 1.
Figure 4:
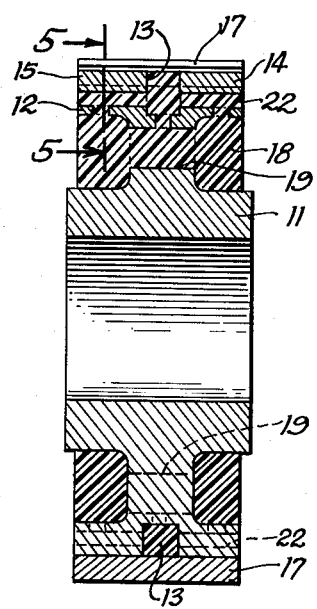
Fig. 4 is a sectional view taken along the line 4—4 of Fig. 3.
Figure 5:
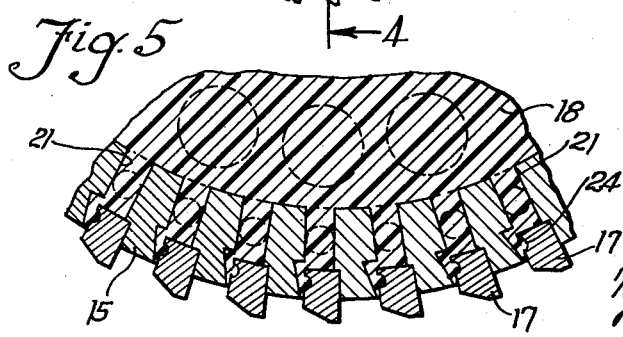
Fig. 5 is an enlarged detail fragmentary sectional view taken along the line 5—5 of Fig. 4.
Figure 6:
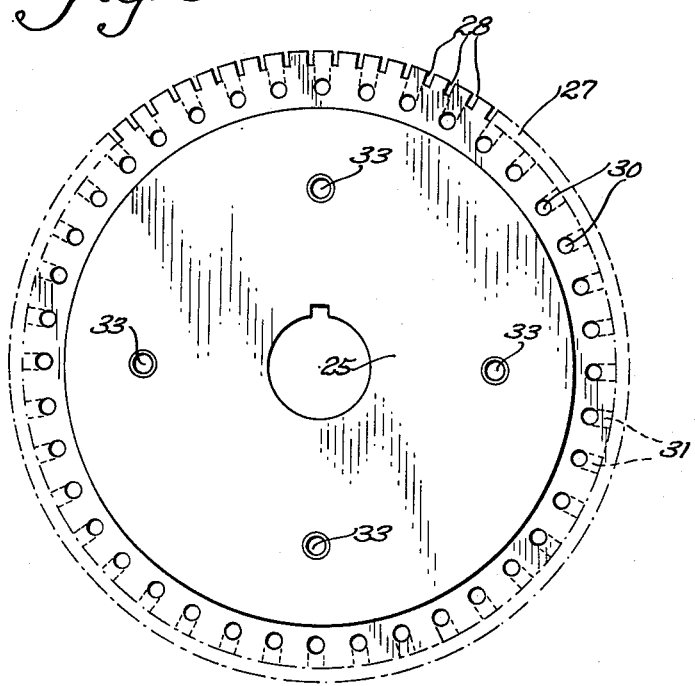
Fig. 6 is an end elevational view of the hub or body portion employed in constructing another type of cutter embodying the present invention.

Referring now to the Figs. 1 to 5, inclusive, the invention is therein shown as embodied in a peripheral mill or cutter 10 which includes a hub or body portion 11 having a rim portion 12 in which is formed an annular groove 13 (Fig. 2) which divides the rim portion 12 into a pair of spaced annular flanges 14 and 15. In order properly to locate the cutting teeth on the body or hub portion 11, the annular flanges 14 and 15 are provided, as shown, with a plurality of equally spaced recesses 16 adapted to receive the cutting teeth 17 as shown in Figs. 3 and 5.

The cutting teeth or blades 17 which are preferably made of sintered carbide as heretofore indicated, are held in the recess 16 in substantially non-vibratory relation by means of an anchoring or filling material 18 which, in accordance with the present invention, is preferably a plastic material or a low melting point alloy such as lead, the principal desideratum being that the anchoring material be a relatively soft non-resilient or dead material.

As shown in Fig. 2, the tooth receiving recesses 16 are preferably disposed at an angle so as to provide a helical arrangement of the teeth. While this helical angle may vary from zero to approximately twenty-five degrees, an angle of approximately eighteen degrees is most commonly used. An angle substantially less than eighteen degrees may, when milling certain types of work pieces, prevent the simultaneous contact with the work of a plurality of teeth, which is highly desirable in reducing vibrations, while an angle substantially greater than eighteen degrees unnecessarily increases the lateral forces on the cutter which may be undesirable. In any event, a helical tooth angle substantially greater than eighteen degrees provides no advantage which would offset the increased lateral forces. The recesses 16 are equally spaced about the periphery of the cutter body and in accordance with the present invention are so spaced as to provide a tooth pitch of less than one-half inch, which tooth pitch may vary between one-sixteenth of an inch and one-half inch as desired.

In order to insure that the cutting teeth 17 are firmly and securely held on the cutter body in substantially vibrationless relation, while at the same time permitting ready removal or replacement of one or more of the teeth, in the event that damage or breakage should occur, the hub portion or body 10 is provided with a plurality of axially extending cylindrical passageways 19 arranged to communicate with annular grooves 20 formed in opposite faces of the body 11 adjacent the rim portion 12. To permit the plastic or similar dead filler material to flow to all portions of the body 11 so as to become an integral part thereof and to partially imbed the cutting teeth 17, additional communicating passageways are provided. Thus, as shown in Fig. 2, the cylindrical passageways 19 communicate by means of axially extending passageways 21 with the annular groove 13. Additionally, for reinforcing and strengthening purposes, cylindrical passageways 22 are formed in the rim portion 12 which passageways are intersected by additional radial passageways 23 extending from the teeth receiving recesses 16 to the annular grooves 20. In order to assemble the cutter 10, the cutting blades 17 are positioned within the recesses 16 and the plastic or dead material, preferably under pressure, is admitted to the assembly and caused to flow therethrough so as to completely fill all of the passageways, grooves and recesses, whereby the cutting teeth are partially imbedded in the plastic and securely and firmly anchored in position. As shown in Fig. 5, the cutting teeth 17 may, if desired, be provided with suitable indentations 24 so as to provide an additional interlock with the plastic material 18 after the plastic has hardened.

The body portion 11 is preferably constructed of a suitable metal such as steel having a higher melting point than the dead plastic or filler material 18 and consequently, when it is desired to replace any or all of the teeth, it is necessary only to heat the assembly to a temperature above the melting point of the dead plastic material so as to permit ready removal of the cutting teeth for replacement, regrinding or the like.

Figure 7:
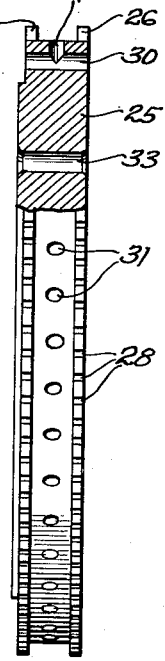
Fig. 7 is a side elevational view partially in section of the hub portion shown in Fig. 6.

In the embodiment of the invention shown in Figs. 6 to 9, inclusive, a steel hub portion or body 25 is provided which is circumferentially grooved, as shown in Fig. 7, to provide a pair of spaced flanges or rims 26 and 27. Each of the flanges 26 and 27 is provided with a plurality of axially extending slots or recesses 28 which may be milled or otherwise formed in the flanges at any suitable angle to provide a helical arrangement as heretofore described in connection with the embodiment of Figs. 1 to 5, inclusive. In order firmly to hold the teeth 29 in the slots or recesses 28, the body 25 is provided, as shown in Fig. 7, with a plurality of axially extending holes 30 and with a plurality of radially extending openings 31 which communicate with the holes 30 and with the circumferential groove between the flanges 26 and 27.

Figure 8:
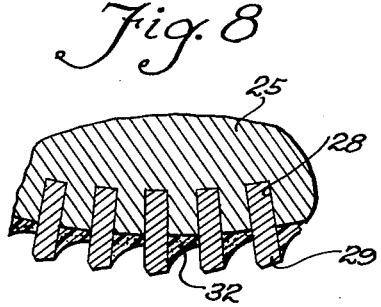
Fig. 8 is a detail fragmentary view on a somewhat larger scale of a portion of the cutter body of Fig. 6 showing the cutting elements or teeth mounted therein.
Figure 9:
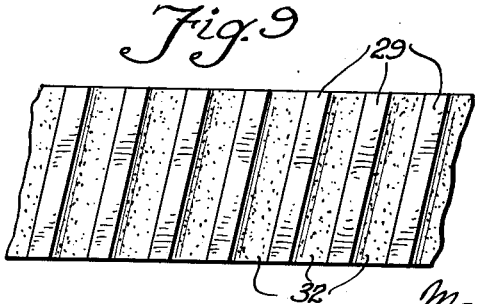
Fig. 9 is a fragmentary plan view of a portion of the cutter shown in Fig. 8.

In this embodiment of the invention, the teeth are first positioned in the slots 28 and the assembly is placed in a suitable mold wherein the plastic material, indicated by the reference numeral 32 in Fig. 8, may be forced into the openings 30 and 31 and into the slots or recesses 28 and the space between the flanges 26 and 27 so as completely to surround and encase the cutting teeth. After the moulding operation has been completed, the plastic material 32 is ground and partially removed from the cutting face of each blade so as to form a suitable chip clearance space and the blades or teeth themselves are thereafter ground first on the periphery and then on the cutting face to provide the finished cutter. The particular cutter shown in Figs. 6 to 9, inclusive, is approximately twelve inches in diameter and is provided with one hundred fifty cutting teeth or blades so as to provide a tooth pitch of approximately one-quarter inch. It will be observed that the cutter shown in Figs. 6 to 9, inclusive, is relatively narrow axially and if desired, a plurality of such cutters may be assembled in side-by-side relation and secured together to provide a cutter of increased width, suitable axially extending bolt receiving holes 33 being provided in the body portion 25 for this purpose.

Although the cutters disclosed herein are shown as being of cylindrical shape, it will be appreciated that any desired shape of cutter may be employed and the invention may be embodied in face mills as well as peripheral mills. In cutters constructed in accordance with the present invention, the necessity of providing wedges or screws or other mechanical devices for holding the cutting blades in place is eliminated, thereby permitting the pitch of the teeth to be reduced to a minimum, if desired, and the teeth are secured in substantially vibrationless yet readily removable relation.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed and desired to be secured by Letters Patent is:

1. A milling cutter comprising a hub portion including axially spaced peripheral flanges having a plurality of aligned recesses in the periphery thereof, a plurality of cutting teeth positioned in said recesses and extending across the space between said flanges, said recesses being spaced to provide a tooth pitch not greater than one-half inch, and a body of relatively soft dead material disposed in said space and extending into said recesses for maintaining said teeth in assembled position in said recesses.

2. A milling cutter comprising a hub portion including axially spaced peripheral flanges having a plurality of aligned recesses in the periphery thereof, a plurality of cutting teeth positioned in said recesses and extending across the space between said flanges, said recesses being spaced to provide a tooth pitch not greater than one-half inch, and a body of non-resilient plastic material disposed in said space and extending into said recesses so as partially to imbed said cutting teeth to maintain said teeth in assembled relation on said hub portion and minimize self-induced vibration of said teeth.

3. A milling cutter of the character described comprising, in combination, a hub portion, a rim portion provided with a plurality of recesses in the outer cylindrical face thereof, a plurality of cutting blades positioned within said recesses, said rim portion including separate axially and radially extending passageways disposed in intersecting relation at least some of which communicate with said recesses, and a material having a relatively low melting point imbedded in said passageways and adapted to maintain the cutting blades in assembled position within said recesses.

4. A milling cutter of the character described comprising, in combination, a hub portion, a rim portion provided with a plurality of transversely extending recesses in the outer face thereof, said outer face having an annular groove connecting said recesses, a plurality of cutting blades positioned within said recesses and extending across said groove, said rim portion including a plurality of axially and radially extending passageways disposed to intersect each other and to communicate with said groove and said recesses, and a material having a relatively low melting point imbedded in said groove and passageways and adapted to maintain the cutting blades in assembled position within said recesses.

5. A milling cutter of the character described comprising, in combination, a hub portion, a rim portion provided with a plurality of recesses in the outer cylindrical face thereof, a plurality of cutting blades positioned within said recesses, said rim portion including separate axially and radially extending passageways disposed in intersecting relation at least some of which communicate with said recesses, and a non-resilient plastic material imbedded in said passageways and adapted to maintain the cutting blades in assembled position within said recesses and to minimize self-induced vibration of said blades.

References Cited in the file of this patent

UNITED STATES PATENTS

| Number | Name | Date |
|---|---|---|
| 1,148,597 | Lewis | Aug. 3, 1915 |
| 1,797,026 | Sharp | Mar. 17, 1931 |
| 1,866,602 | Ridgeway et al. | July 12, 1932 |
| 2,036,656 | Stowell et al. | Apr. 7, 1936 |
| 2,080,401 | Heard | May 18, 1937 |
| 2,325,746 | Curtis | Aug. 3, 1943 |
| 2,357,088 | Curtis | Aug. 29, 1944 |
| 2,359,675 | Preece | Oct. 3, 1944 |
| 2,363,272 | Taeyaerts et al. | Nov. 21, 1944 |
| 2,390,351 | Bolton | Dec. 4, 1945 |
| 2,581,449 | See | Jan. 8, 1952 |

FOREIGN PATENTS

| Number | Country | Date |
|---|---|---|
| 2,663 | Great Britain | 1896 |
| 2,663 | Great Britain | Feb. 5, 1896 |
| 135,802 | Great Britain | Dec. 4, 1919 |
| 473,245 | France | Jan. 6, 1915 |